(12) United States Patent
Roeders

(10) Patent No.: US 7,018,103 B2
(45) Date of Patent: Mar. 28, 2006

(54) ACTIVE VIBRATION DAMPING IN A MACHINE TOOL

(75) Inventor: Juergen Roeders, Hamburg (DE)

(73) Assignee: P&L GmbH & Co. KG, Hamburg (DE)

(*) Notice: Subject to any disclaimer, the term of this patent is extended or adjusted under 35 U.S.C. 154(b) by 0 days.

(21) Appl. No.: 10/621,093

(22) Filed: Jul. 16, 2003

(65) Prior Publication Data

US 2004/0057639 A1 Mar. 25, 2004

(30) Foreign Application Priority Data

Jul. 18, 2002 (DE) ............... 102 32 637
Oct. 10, 2002 (DE) ............... 102 47 354

(51) Int. Cl.
*F16C 29/02* (2006.01)
(52) U.S. Cl. .......................... 384/99; 384/12
(58) Field of Classification Search ............... 384/99, 384/12, 118, 111, 121
See application file for complete search history.

(56) References Cited

U.S. PATENT DOCUMENTS

| | | | |
|---|---|---|---|
| 3,032,142 A | 5/1962 | Axer et al. |
| 3,266,854 A | 8/1966 | Aller |
| 3,512,848 A | 5/1970 | Uhtenwoldt |
| 4,636,095 A | 1/1987 | Gerling |
| 5,238,308 A | 8/1993 | Lang et al. |
| 5,447,375 A | 9/1995 | Ochiai et al. |

FOREIGN PATENT DOCUMENTS

| | | |
|---|---|---|
| DE | 1 166 589 | 3/1964 |
| DE | 1 909 192 U1 | 11/1965 |
| DE | 1 924 894 A1 | 11/1969 |
| DE | 32 41 940 A1 | 6/1983 |
| DE | 3444344 A1 | 6/1986 |
| DE | 43 04 950 A1 | 8/1994 |
| DE | 196 48 594 A1 | 5/1998 |
| FR | 2 574 154 A1 | 6/1986 |
| GB | 906818 | 9/1962 |
| WO | WO 94/07045 | 3/1994 |
| WO | WO 02/45891 A1 | 6/2002 |

OTHER PUBLICATIONS

Database WPI Week 8333 Derwent Publications Ltd., London, GB; AN 1983-740090 XP002261643 & SU 965 709 A (Osboe K Byuro Stankostr), Oktober 25, 1982 (Oct 25, 1982) * Zusammenfassung *.

*Primary Examiner*—Lenard A. Footland
(74) *Attorney, Agent, or Firm*—Pearne & Gordon LLP

(57) ABSTRACT

The present invention relates to a method and an apparatus for vibration damping in a machine tool comprising at least one hydrostatic guide 8 including at least one pocket 1 for supporting a first component 9 on a second component 10, through which an oil flow is passed with a predetermined volume flow and at a predetermined pressure and exits through at least one gap 3, characterized in that the oil flow through the gap 3 is regulated in response to the loads arising so as to achieve a constant width of the gap 3.

12 Claims, 2 Drawing Sheets

ACTIVE VIBRATION DAMPING IN A MACHINE TOOL

DESCRIPTION

The present invention relates to active vibration damping in a machine tool and specifically to both a method for vibration damping and an apparatus for performing the method.

During the mechanical machining of workpieces on machine tools, undesired vibrations are often arising. These may lead to dimensional inaccuracies and/or poor surface qualities of the workpiece.

Such vibrations may e.g. be caused by the machining process. For instance, the problem arises in milling tools that the individual cutting edges or teeth of the tool are successively engaged, thereby producing vibrations. These are e.g. expressed as chatter marks on the surface of the workpiece. However, they also lead to vibrations of the constructional elements of the machine tool itself.

In dynamic machine tools, e.g. portal-type or double-column milling machines or the like, vibrations may additionally be caused by the movements of the individual constructional elements or subassemblies of the machine tool itself. The short machining times require very fast traveling speeds of the individual spindles, supports, or similar subassemblies. Furthermore, with workpieces that are to be manufactured with very small radii, the path of the tool or the workpiece has to be changed within very short periods of time in order to realize the desired changes in curvature or direction. In this process the travel speeds in the axes must be so fast that these effect intermittent loads on the machine tools. Vibrations are also caused thereby.

It has turned out to be very disadvantageous when the excitation of the vibrations coincides with the natural frequency of the machine tool. Such undesired frequencies may be due to both the machining process itself and the dynamic process of the machine tool and the components thereof. The result may be an escalation with particularly large dimensional deviations and poor surface qualities.

It is known from the prior art that such problems can be minimized in that the machine tools are designed to be as stiff as possible and have no natural frequencies in the low frequency range, if possible. Apart from the manufacturing costs for such machine tools, it is not always possible to avoid or suppress the occurrence of said undesired vibrations.

Furthermore, the prior art already discloses machine tools that as guide elements comprise so-called "hydrostatic guides". These have e.g. a planar functional surface in one component while a pocket with oil flowing therethrough is incorporated into the other tool. The pocket is defined by lateral webs forming a gap with respect to the other component, with oil passing through said gap.

Hence, a sliding of the two components on one another by means of the oil film is possible by corresponding pressure application of the oil contained within the pockets.

With an increasing load the gap decreases accordingly. The oil pressure is correspondingly increased by mechanical measures in the prior art in order to absorb this additional load. When the load decreases, the gap will increase accordingly. The oil pressure in the pocket will then be reduced. Thus, the prior-art solutions have the effect that the width of the gap (which means its free cross-section of flow) is kept as constant as possible. This has the effect that vibrations of the individual components of constructional elements/subassemblies need not be taken into account.

It is thus possible to produce utmost stiffness in hydrostatic guides. To this end at an increased load, the pressure of the oil fed into the pocket is increased to such an extent that, despite the gap being smaller due to the higher load, a larger volume flow is pressed through the narrowed gap. However, the increase in pressure of the supplied oil is not sufficient to correct an increased load such that the gap assumes the same size again within a finite period of time. Hence, the increased load leads to a change in the gap that is permanent—though small because of the large volume flow. The known regulation adapts the pressure to the load of the pocket, thereby increasing the stiffness of the guide. The gap, however, changes because of different loads.

It is the object of the present invention to provide a method for vibration damping in a machine tool and an apparatus suited therefor, which permits the damping of arising vibrations while being of a simple construction and usable in an easy and operationally reliable way.

According to the invention this objet is achieved by the features of the two independent claims; the sub-claims show further advantageous developments of the invention.

Hence, according to the invention, the oil pressure in the pocket is regulated in response to the loads arising in the hydrostatic guide.

Thus, the invention permits active vibration damping in the machine tool by means of the hydrostatic guides. The oil pressure in the individual pockets is here regulated such that vibrations arising in the machine tool are actively dampened.

With an active control of the volume flow and a constant measuring of the gap size, the volume flow can be regulated according to the invention such that upon a change in load the first resulting change in the gap is corrected within a finite period of time such that the gap reassumes its original dimension despite the increased load, e.g. with the help of a PID controller. Measured variable is the gap, manipulated variable the volume flow, which is regulated in response to the load such that the gap will reassume a constant dimension within a finite period of time upon changes in load. Instead of a measurement of the gap size, the pocket pressure can also be used as an input signal because it is possible to determine for a given pocket geometry at a constant gap dimension for different loads on the guide which volume flow is required at which pressure to absorb different loads at a constant gap dimension. The volume flow is always regulated such that it coincides with a pressure corresponding to a constant gap dimension. To this end the volume flow can be regulated, for instance, via a proportional valve as shown in FIG. 2.

According to the invention it is also possible to regulate the oil flow by means of the width of the gap.

Hence, according to the invention there is a relationship between the oil pressure in the pocket and the oil volume flow exiting through the gap. As the disturbance variable, the load is caused by the forces arising at the respective frequencies. These form the corresponding disturbance. Without any external action the pressure in the pocket as well as the volume flow would change accordingly, as is also known in the prior art, in dependence upon the load arising, resulting in the corresponding gap width. The undesired vibration behavior will then follow from these very processes. It is possible by actively varying the pressure and/or the volume flow, as intended according to the invention, to keep the gap width constant on the one hand and to dampen undesired vibrations on the other hand.

Hence, it is possible according to the invention to regulate either the oil flow into the pocket or the oil volume in the pocket. Both operations are carried out by a superposed control which as the measured variable uses e.g. the oil pressure in the pocket or the width of the gap as a basis.

It goes without saying that according to the invention individual pockets of the hydrostatic guide and also all pockets of all hydrostatic guides of a whole machine tool or a whole system can be controlled.

According to the invention either distance sensors or pressure sensors can be used in the individual pockets for exactly sensing the actual state in the respective pocket. It is thus possible via very fast control valves to determine and regulate the volume flow of the oil into the individual pockets accordingly.

It is particularly advantageous when a pressure reservoir is provided in front of the respective control valve to provide an adequate amount of oil at a high pressure for the control.

The vibration damping action according to the invention can also take other data as a basis for the invention in a preferred way. For instance, it is possible to provide further sensors, e.g. acceleration pickups that are fastened to other locations of the machine tool.

It is e.g. possible to arrange acceleration pickups at the lower end of the Z-axis of a portal type machine. It is thereby e.g. possible to actively suppress, for instance, an undesired pendulum movement (vibration) in the Z-axis.

A second essential aspect of the invention is the simultaneous consideration of several pockets in one control unit (of a controller). The further solutions have tried to make the guide as stiff as possible by controlling the pockets separately and independently. In the invention all pockets that support a machine element, e.g. the machine table for the workpiece or the Z-axis of the portal type machine, are taken into account at the same time and controlled such that the machine element is supported without any vibrations on the whole and almost in an infinitely stiff way, and/or vibrations originating from the machine element, which are excited by the machining or the dynamic traveling movement of the machine, are actively damped by adaptation/modulation of the pocket pressures.

In a further variant of the invention it is thus possible to sense all status data (gap width and/or oil pressure or further data) of the individual pockets of the individual hydrostatic guides or supports of the machine tool in the vibration damping control according to the invention. Furthermore, since the movement sequence of workpiece and tool and thus the movements of the individual axes of the machine tool are known in addition, the control unit according to the invention can predetermine the resulting accelerations and the resulting dynamic loads of the individual pockets of the individual hydrostatic guides. The loads arising can be compensated actively by a corresponding control of the oil pressure in the individual pockets before said loads lead to changes in the gap sizes within the pockets. This means that the control unit according to the invention sets the oil pressure or oil volume actively in an exact way such that the occurrence of undesired vibrations is avoided from the start. The additional load resulting from the movement processes and accelerations can thus be absorbed without any change in the gap.

Furthermore, it is possible according to the invention to regulate the oil pressure in the pockets such that with a constant vibration behavior of the machine tool or the components or machine elements of the machine tool the occurrence of vibrations is actively suppressed. This means that e.g. the oil pressure in the individual pockets is actively changed such that the natural vibration behavior of the machine tool does either not influence the gap widths or gap sizes or the arising vibrations can be dampened very rapidly. In the first case the occurrence of undesired vibrations is avoided from the start.

According to the invention it may also be taken into account that in some concepts of machine tools the behavior of the individual axes is overlapping. In a portal type machine a pendulum movement of the Z-axis, for instance, has an effect on the guide in Z-direction and on the guide in Y-direction. Hence, an active compensation for a pendulum movement regulates the pressure in the pockets of both guides Y-direction and Z-direction) according to the invention. Hence, it is of essential importance according to the invention that in program-controlled machines the sequence of movement of the individual axes through the program, e.g. the milling program on a milling machine, is known. On the basis of the program it is possible to determine the movement sequence of the individual machine elements and to calculate the resulting changes in load in the individual pockets supporting the respective machine elements. With the help of this calculation the volume flows into the pockets supporting the respective machine element can be pre-controlled such that the resulting changes in the pocket pressures compensate the changes in load resulting from the machine program and keep the gap dimensions constant in all pockets. The necessary calculations can be carried out online in the case of powerful machine controls, i.e. during execution of the programs. The machine control unit will then control the travel movement of the machine axes and, at the same time, the volume flows into the pockets of the hydrostatic guides.

According to the invention there are different possibilities of solution with respect to the apparatus. Apart from the use of control valves, it is also possible to vary the respective work volume of the pocket itself. This can e.g. be carried out by piston/cylinder units or by corresponding piezoelectric elements. These show a very rapid response and lead to a change in the work volume of the pocket and thus to a change in pressure of the oil positioned in the pocket.

Furthermore, it may be of advantage when in machine elements which are deformed because of the sequence of movements, e.g. a lateral acceleration process of the Z-axis of a portal type machine, on account of their finite stiffness, the above-mentioned pre-control is overridden, i.e. the gap sizes of the pockets supporting the machine element are changed in a targeted way such that the machining inaccuracies caused by the deformation of the respective machine element are minimized on the machine.

According to the invention it has turned out to be of particular advantage when the oil pressure and/or the oil flow and/or the oil volume of several pockets of several hydrostatic guides of a machine tool are regulated by means of a joint control unit. It is thus particularly possible to actively dampen vibrations of components, be it components of the machine tool or workpieces. The control according to the invention can here consider constructional conditions. The vibrations arising may either be vibrations of the components that are excited from the outside, or these may be vibrations of the component or the workpiece itself. Hence, according to the invention this opens the possibility of either measuring, and correcting in real time, such vibration behavior or of controlling such behavior accordingly and of taking into account the values stored in a memory under working conditions of the machine tool causing the occurrence of vibrations and of adapting the control accordingly.

According to the invention, it is particularly advantageous when the individual pockets are controlled independently of one another. Hence, the corresponding hydrostatic guides can be taken into account with respect to their natural behavior. It can also be taken into account which forces and vibrations act on the individual hydrostatic guides independently of one another.

Hence, the invention opens the possibility of either calculating the arising vibrations and of making the values available in a memory, or of measuring the vibrations in real time and of processing them accordingly by means of the control unit.

According to the invention it is thus possible to support a machine element in a highly stiff way because the control unit according to the invention can compensate manufacturing inaccuracies, dimensional inaccuracies, or the like, by way of a corresponding control. This also opens the possibility of using hydrostatic guides that are by far less precise and thus less expensive and of realizing their precise operation by means of the control unit according to the invention. Hence, vibrations excited from the outside as well as natural vibrations can be dampened actively by the control unit of the invention counteracting and damping the vibrations of the machine element actively by a corresponding control of the individual pockets.

According to the invention it is further possible to compensate dimensional inaccuracies, particularly with respect to the gap heights of the hydrostatic guides and other flaws or defects of the guideways. For instance, each of the guideways of the hydrostatic guides is thereby measured on a measurement table (e.g. granite stone). The corresponding values are stored in a memory which can be accessed by the control unit. Hence, during the machining process the control unit according to the invention can access the memory. The unit compares the stored values with the set values and can react immediately, e.g. in response to a distance coordinate of the hydrostatic guide, to compensate the dimensional deviations or defects or flaws of the hydrostatic guide. A hydrostatically supported machine table, for instance, would then travel by means of the control unit according to the invention along a theoretically ideal guideway and not, as is known in the prior art, follow the slight flaws or deviations of the guideway. Slight lateral displacements, e.g. of the guide table relative to the guideway, or slight tilting that might arise as a flaw can thus be compensated according to the invention in that the table is displaced or tilted to counteract such a flaw. The result is the movement along the theoretically ideal guideway. In response to precision and rapidness of the control unit of the invention, the resulting path of the table or component of the machine tool can thus be approximated, as closely as desired, to an ideal movement path.

On the whole, the present invention has the effect that the use of the method according to the invention will achieve such a high degree of precision that is not possible in known machine tools or can only be realized at very great costs.

It goes without saying that the flaw compensations described according to the invention can also compensate thermally created flaws of the guideways.

The present invention is not restricted to longitudinal hydrostatic guides. Rather, the method according to the invention can be used for any hydrostatically supported machine element.

The present invention shall now be described with reference to embodiments taken in conjunction with the drawing, in which.

Figure 1:
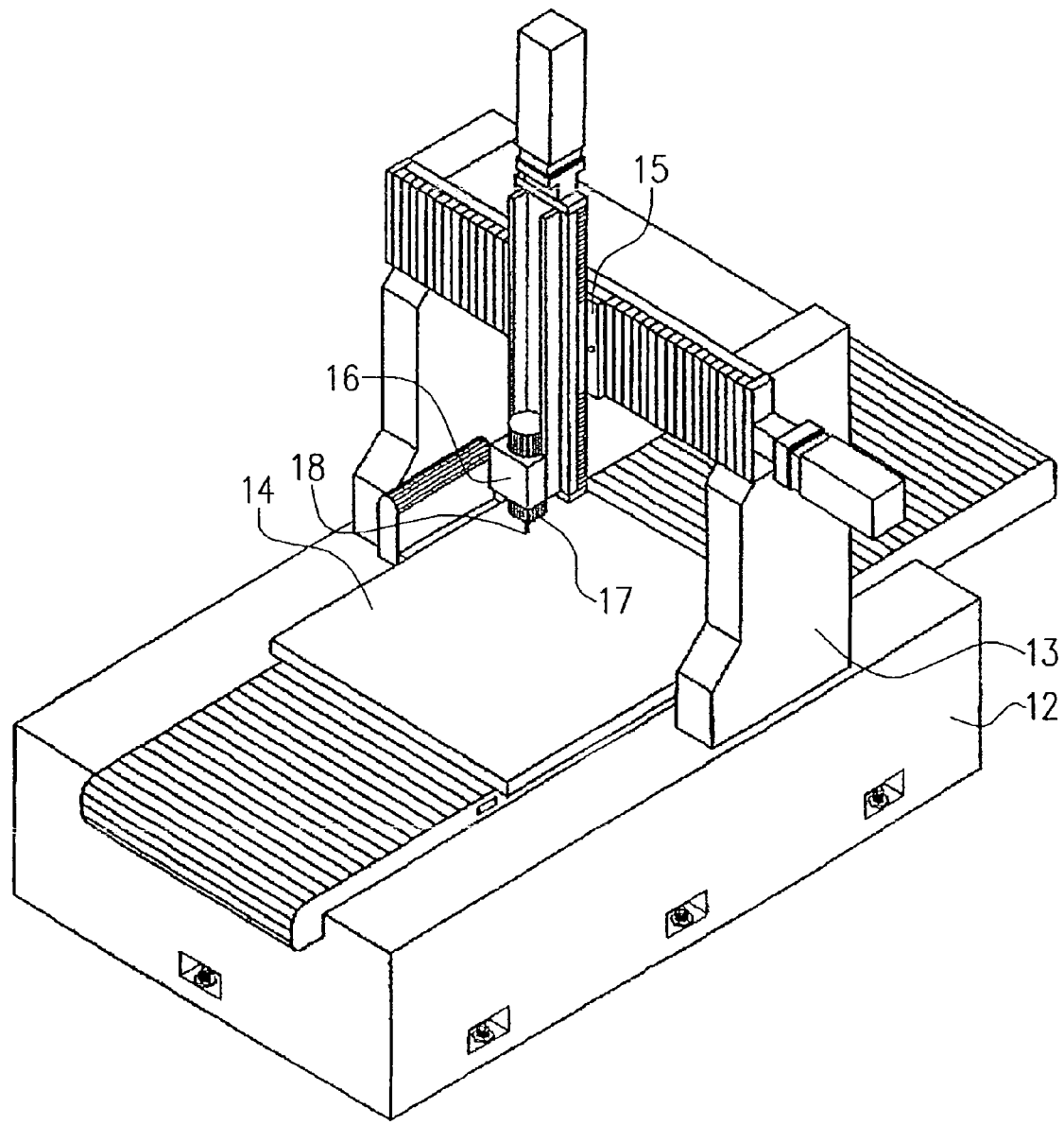
FIG. 1 is a perspective simplified illustration of a machine tool for using the vibration damping according to the invention.

FIG. 1 is a schematic perspective view illustrating a machine tool with a machine bed 12 having supported thereon a portal 13. A table 14 which can carry a workpiece (not shown) is displaceably supported on the machine bed 12. The table 14 is horizontally displaceable.

The portal 13 supports a carrier 15 which is also displaceable in horizontal direction relative to portal 13. The axis of movement of the carrier 15 is arranged at a right angle to the axis of movement of table 14.

A spindle 17 which is rotatable and carries a tool 18 is supported on the carrier 15 in a vertically displaceable manner by means of a component 16.

An illustration of further details, e.g. of the drive units, or the like, is here not needed because these are known from the prior art.

Table 14 is supported on the machine bed 12 by means of a hydrostatic guide 8 (see FIGS. 2 and 3), which is not shown in detail. Likewise, the carrier 15 is supported on the portal 13 by means of a hydrostatic guide. The same applies by analogy to the support of component 16 on carrier 15.

Figure 2:
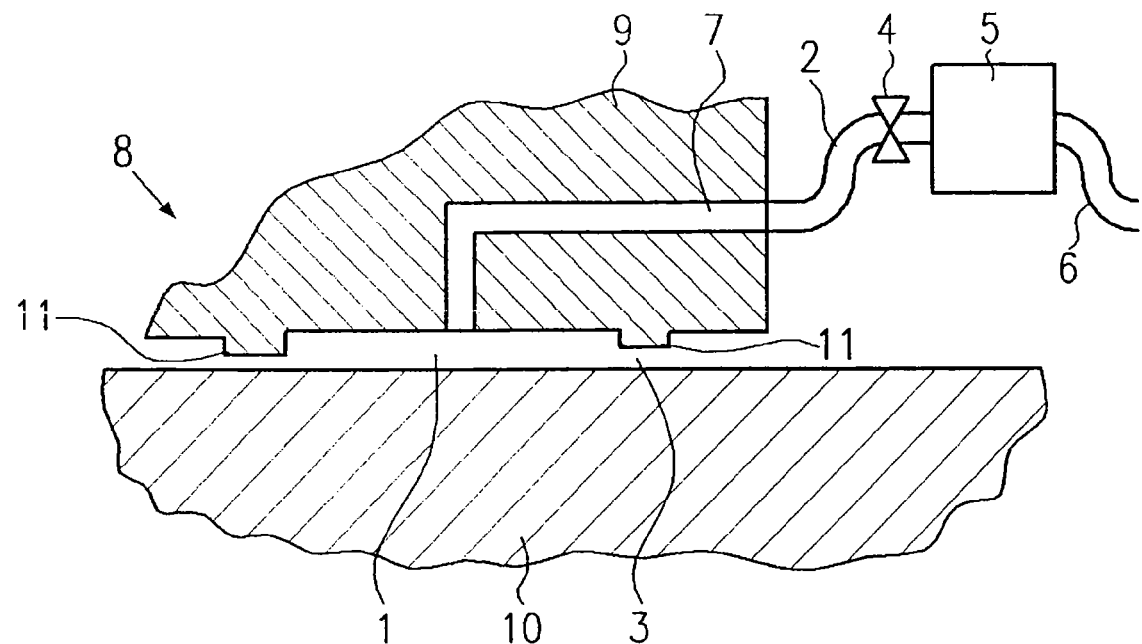
FIG. 2 is a partial sectional view of a hydrostatic guide according to the invention, in a schematized illustration.
Figure 3:
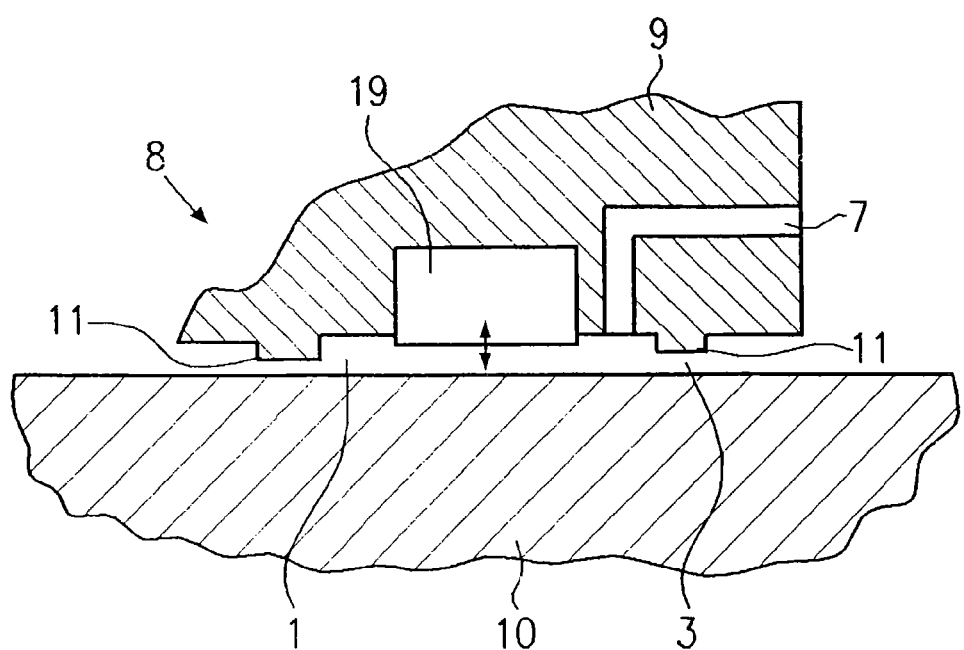
FIG. 3 is a view, similar to FIG. 2, of a further embodiment of the hydrostatic guide.

Each of FIGS. 2 and 3 is a simplified sectional illustration of the hydrostatic guides 8 that serve to support a first component 9 on a second component 10 in a displaceable way.

The hydrostatic guide 8 comprises a corresponding pocket 1 which is acted upon with oil via a supply channel 7. The pocket 1 is defined by webs 11 which with respect to the surface of the second component 10 form a gap 3 through which oil exits.

The supply channel 7 is connected to a supply line 6 for oil.

In the embodiment shown in FIG. 2, a control valve 4 is provided that is arranged upstream of a pressure reservoir 5. Downstream of the control valve 4, there is shown a line 2 which is connected to the supply channel 7. It is possible by operating the control valve 4 to regulate the oil pressure in the pocket 1 and the oil volume introduced into pocket 1.

FIG. 3 shows a modified embodiment which can also be combined with the embodiment shown in FIG. 2. In this case a piezoelectric element 19 by which the volume of pocket 1 can be varied is schematically shown in the area of pocket 1. The oil pressure in pocket 1 will rise by changing the volume by means of the piezoelectric element 19, resulting in an increased oil volume flow through gap 3. An increased load on the first component 9 can thereby be compensated.

The present invention is not limited to the illustrated embodiment. Rather, many alterations and modifications are possible within the scope of the invention. The invention also relates to hydrostatic shaft bearings.

What is claimed is:

1. A method for vibration damping in a machine tool comprising at least one hydrostatic guide (8) including at least one pocket (1) for supporting a first component (9) on a second component (10), through which an oil flow is passed with a predetermined volume flow and at a predetermined pressure and exits through at least one gap (3), comprising the step of:

damping oscillatory vibration in a machine tool to increase the stiffness of the hydrostatic guide (8) by regulating the oil flow through the gap (3) in response to the loads arising and for achieving a constant width of the gap (3), wherein as input quantities accelerations of components (9, 10) are taken into account.

2. The method according to claim 1, characterized in that the loads of the hydrostatic guide are pre-calculated on the basis of the accelerations resulting from the movements of components and/or workpieces, and that in response to said values the oil pressure and/or oil flow through the gap (3) that is required for preventing changes in the width of the gap is pre-calculated.

3. A method for vibration damping in a machine tool comprising at least one hydrostatic guide (8) including at least one pocket (1) for supporting a first component (9) on a second component (10), through which an oil flow is passed with a predetermined volume flow and at a predetermined pressure and exits through at least one gap (3), comprising the step of:

damping oscillatory vibration in a machine tool to increase the stiffness of the hydrostatic guide (8) by regulating the oil flow through the gap (3) in response to the loads arising and for achieving a constant width of the gap (3), wherein the oil pressure and/or the oil flow and/or the oil volume of a plurality of pockets (1) of a plurality of hydrostatic guides (8) of a machine tool are regulated by means of a joint control unit, and wherein the control unit for the active vibration damping of components of the machine tool processes vibrations arising in the components and/or workpieces as input quantities.

4. The method according to claim 3, characterized in that the vibrations of the components are vibrations excited outside the components.

5. The method according to claim 3, characterized in that the vibrations of the components are the natural vibrations thereof.

6. The method according to claim 3, characterized in that the vibrations arising are measured.

7. The method according to claim 3, characterized in that the vibrations arising are calculated.

8. A method for vibration damping in a machine tool comprising at least one hydrostatic guide (8) including at least one pocket (1) for supporting a first component (9) on a second component (10), through which an oil flow is passed with a predetermined volume flow and at a predetermined pressure and exits through at least one gap (3), comprising the step of:

damping oscillatory vibration in a machine tool to increase the stiffness of the hydrostatic guide (8) by regulating the oil flow through the gap (3) in response to the loads arising and for achieving a constant width of the gap (3), wherein the oil pressure and/or the oil flow and/or the oil volume of plurality of pockets (1) of a plurality of hydrostatic guides (8) of a machine tool are regulated by means of a joint control unit, and wherein the control unit processes and compensates dimensional deviations of said guides (8) as input quantities.

9. The method according to claim 8, characterized in that the dimensional deviations are measured and the measured values are supplied to the control unit.

10. The method according to claim 9, characterized in that the dimensional deviations are measured in advance, stored in a memory and the measured values are supplied to the control unit during operation of the machine tool.

11. The method according to claim 8, characterized in that the dimensional deviations are calculated.

12. A method for vibration damping in a machine tool comprising at least one hydrostatic guide (8) including at least one pocket (1) for supporting a first component (9) on a second component (10), through which an oil flow is passed with a predetermined volume flow and at a predetermined pressure and exits through at least one gap (3), comprising the steps of:

regulating oil flow through the gap (3) in response to the loads arising and for achieving a constant width of the gap (3); and accounting for the vibration behavior of the machine tool by predetermining and correspondingly regulating the oil pressure in said pocket (1) or the oil flow through said gap (3) for preventing changes in the width of said gap.

* * * * *